United States Patent [19]

Taig

[11] Patent Number: 4,533,028
[45] Date of Patent: Aug. 6, 1985

[54] MECHANICAL BRAKE CONTROL DEVICE
[75] Inventor: Alistair G. Taig, South Bend, Ind.
[73] Assignee: Allied Corporation, Morristown, N.J.
[21] Appl. No.: 467,701
[22] Filed: Feb. 18, 1983
[51] Int. Cl.³ .............................................. B60K 41/24
[52] U.S. Cl. .................................. 192/13 A; 192/3 H
[58] Field of Search .................. 192/3 H, 13 A, 30 V, 192/44; 188/353; 303/98; 74/470, 477, 490; 403/397, 11

[56] References Cited

U.S. PATENT DOCUMENTS

| | | | |
|---|---|---|---|
| 1,909,859 | 5/1933 | Gunderman | 192/13 A |
| 2,036,700 | 4/1936 | Johnson | 192/13 A |
| 2,048,501 | 7/1936 | Goosman | 192/30 V |
| 2,131,944 | 10/1938 | Freeman | 192/13 |
| 2,160,126 | 5/1939 | Coffman | 192/13 |
| 2,167,501 | 7/1939 | Freeman | 192/13 |
| 2,228,244 | 1/1941 | Baker | 188/67 |
| 2,251,787 | 8/1941 | Gardiner | 192/13 A |
| 2,284,189 | 5/1942 | Dick | 192/3 H |
| 2,499,993 | 3/1950 | Gregg | 188/67 |
| 2,722,847 | 11/1955 | Petrochko | 74/478.5 |
| 3,659,329 | 5/1972 | Walker | 403/11 |
| 4,299,134 | 11/1981 | Roy et al. | 74/470 |

FOREIGN PATENT DOCUMENTS 1455631  5/1969  Fed. Rep. of Germany .

Primary Examiner—Rodney H. Bonck
Assistant Examiner—Richard M. Lorence
Attorney, Agent, or Firm—Larry J. Palguta; Ken C. Decker

[57] ABSTRACT

An improved mechanical brake control device includes a flexible connecting member between a brake pedal and a clutch pedal. The flexible connecting member is part of the control device which operates to hold a vehicle on an incline upon termination of braking.

25 Claims, 4 Drawing Figures

U.S. Patent
Aug. 6, 1985
4,533,028
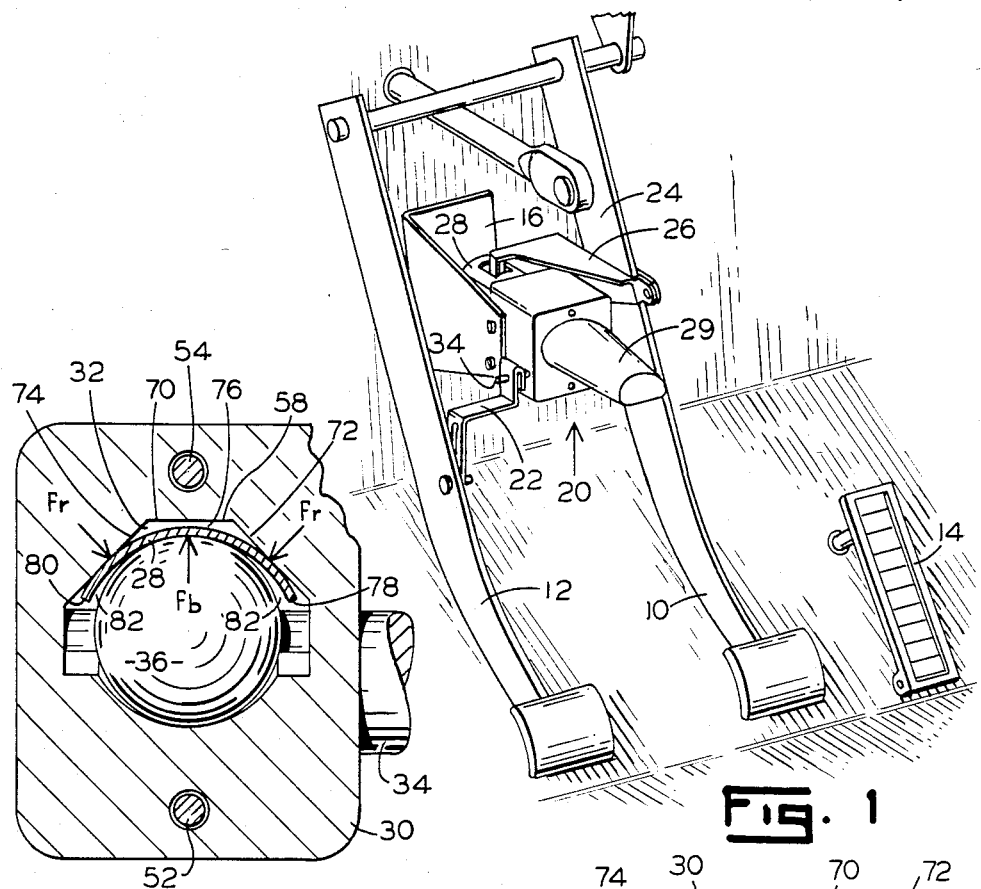
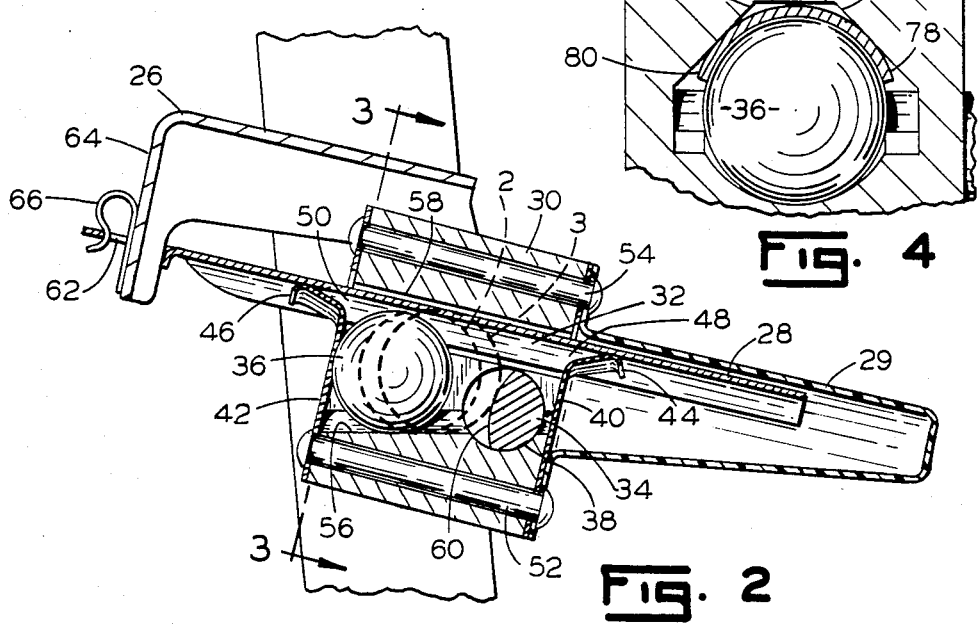

MECHANICAL BRAKE CONTROL DEVICE

This invention relates to an improved mechanical brake control device wherein a vehicle with a brake pedal and a clutch pedal is retained on an incline when the brake pedal is released upon termination of braking and the clutch pedal is depressed by a vehicle operator.

A vehicle with a clutch pedal for controlling a manual transmission is difficult to operate when the vehicle is stationary on an incline and the vehicle operator must drive the vehicle up the incline. As the vehicle operator moves his foot from the brake pedal to the accelerator, the vehicle begins to roll backwards down the incline. Consequently, instantaneous reaction is required by the vehicle operator to release the clutch and accelerate at the same time the brake pedal is released to prevent the vehicle from rolling back down the incline.

It has been proposed by U.S. Pat. No. 1,909,859 (Gundermann) to engage a locking device with the brake pedal to retain the latter in an applied position until the clutch pedal is released. This locking device is engaged with the brake pedal every time the clutch pedal is depressed regardless an incline or flat surface.

In my copending application Ser. No. 421,218, filed Sept. 22, 1982, a brake control device is disclosed which includes attitude sensing to only engage a locking ball with a connecting member when the vehicle is on an incline. This device utilizes a relatively bulky connecting member which adds to the weight of the packaged device. In addition, the locking device will lock the brake pedal in an applied position with the same force as that applied by a vehicle operator, even though less force will retain the vehicle on the incline. In order to accommodate a large brake application force during a "spike" apply, the device required added strength to maintain the large force when the operator removed his foot from the brake pedal.

The present invention provides an improved brake control device for a vehicle including a brake pedal and a clutch pedal wherein the brake is movable to a brake applied position during braking and the clutch pedal is movable to an actuated position to control operation of a transmission or the like for the vehicle, the device comprising a housing associated with the vehicle, a connecting member coupled to the brake pedal and movable therewith relative to the housing, locking means carried by the housing and cooperating with the connecting member, control means coupled to the clutch pedal and cooperating with the locking means to alter the cooperation of the latter with the connecting member in response to the position of the clutch pedal, the locking means being engageable with the connecting member when the vehicle is on an incline and the clutch pedal is in its actuated position to resist movement of the connecting member and retain the brake pedal in the brake applied position whereby the vehicle is substantially prevented from rolling down the incline, characterized in that said connecting member is resilient to deform slightly when said locking means is engaging said connecting member and said deformation of said resilient connecting member providing for gradual disengagement between said locking means and said resilient connecting member in response to operation of said control means.

It is an advantage of the present invention that the flexible connecting member is formed in a relatively inexpensive stamping operation, starting with a flat piece of material. The connecting member is lightweight and is also designed to cooperate with the control means to limit the holding force on the brake pedal.

The accompanying drawings are provided to illustrate a preferred embodiment of the invention.

FIG. 1 is a perspective view of a vehicle brake pedal and clutch pedal with the control device coupled therebetween.

FIG. 2 is a cross section of the control device.

FIG. 3 is a cross section taken along line 3—3 of FIG. 2.

FIG. 4 is a view similar to FIG. 3 showing the ball and connecting member in an actuated position.

A brake pedal 10 is provided in a vehicle to control operation of a vehicle brake system. A clutch pedal 12 is provided to control the coupling between a transmission and an engine (not shown). An accelerator 14 controls the engine speed. A bracket 16 is secured to the vehicle by suitable means and the bracket disposes the improved mechanical brake control device 20 between the brake pedal 10 and the clutch pedal 12. A control link 22 extends between the device 20 and the clutch pedal 12 while a connecting linkage 24 includes a connecting bracket 26 and a connecting member 28. The connecting bracket 26 and connecting member 28 extend between the brake pedal 10 and the device 20 with the bracket secured in a limited manner to the brake pedal 10 and the connecting member 28 extending through the device 20. A cover 29 encloses the connecting member 28 in the direction of a vehicle operator.

Turning to FIG. 2, the control device 20 includes a housing 30 with an opening 32 therethrough, the connecting member 28, a control cam shaft 34 fixedly secured to the control link 22 and a locking ball 36. For clarity, the control cam shaft 34 is shown in a rotated position as if the clutch pedal is depressed even though FIG. 1 shows the clutch pedal in a released position. The control cam shaft 34 is rotatably disposed within a bore 38 intersecting the opening 32. In order to movably support the connecting member 28 near the top of opening 32, a pair of plates 40 and 42 are secured to the housing 30 to trap the locking ball 36 in the housing. The pair of plates include tabs 44 and 46 forming apertures 48 and 50 in the plates. The tabs engage the connecting member 28 to carry the latter in the apertures 48 and 50 near the top of opening 32. A pair of pins 52 and 54 secure the plates 40 and 42 to the housing 30.

The locking ball 36 is free to roll on a guide surface 56 normally disposed on a substantially horizontal axis when the device 20 is secured to the vehicle and the latter is disposed on a level surface. The top surface 58 of opening 32 approaches the guide surface 56 from plate 42 to plate 40. In the position shown in FIG. 2, the locking ball 36 is engaging the plate 42 in spaced relation to the connecting member 28. The locking ball 36 is shown in phantom in FIG. 2 in a second position engaging the connecting member 28 and the guide surface 56 while spaced from a cam profile 60 of control cam shaft 34. The locking ball 36 is also shown in phantom in FIG. 2 in a third position engaging the cam profile 60 and the guide surface 56 while interfering with the connecting member 28. These different positions for the locking ball 36 will be more fully explained hereinafter.

The connecting member 28 is made from a flat piece of material which is stamped to form an arcuate profile for the connecting member in a direction normal to the direction of travel for the connecting member. The connecting member is provided with an aperture 62 for receiving an arm 64 of the connecting bracket 26. A spring clip 66 is also disposed within the aperture 62 to prevent rattle and take up any clearances between the connecting bracket 26 and the connecting member 28. The connecting member 28 is relatively flexible in a plane normal to the direction of travel for the connecting member 28 so that the locking ball 36 is capable of deforming the connecting member 28 during operation of the control device 20. The control link 22, control cam shaft 34, and locking ball 36 collectively comprise a control assembly for defining a locking fit with the connecting member 28, as hereinafter explained.

As shown in FIG. 3, the top surface 58 of opening 32 is provided with a flat middle surface 70 and a pair of side surfaces 72 and 74 extending angularly from the flat middle surface 70. The plate tabs 44 and 46 retain the connecting member 28 in engagement with the side surfaces 72 and 74 while the connecting member is spaced from the flat middle surface 70 to define a clearance 76. The surfaces 72 and 74 engage the connecting member 28 near longitudinally extending edges 78 and 80. In the second position illustrated for the connecting member 28 in FIG. 3, the radius for the arcuate profile of the connecting member 28 is larger than the radius for the locking ball 36 so that when the locking ball 36 first contacts the connecting member 28 a spacing 82 is defined between the locking ball 36 and the edges 78 and 80 of the connecting member 28.

When the vehicle is in operation and the clutch pedal 12 is in its released position of FIG. 1, the cam profile 60 will be rotated in FIG. 2 to a position preventing the locking ball from engaging both the guide surface 56 and the connecting member 28 so that the latter is free to move within the opening 32 without any interference, regardless of the angular attitude of the vehicle. If the clutch pedal is depressed and the cam profile is disposed as shown in FIG. 2, the locking ball 36 will remain adjacent the plate 42 so long as the vehicle is on a substantially level surface. The connecting member 28 will move freely in the opening 32 when the vehicle is on the level surface.

When the vehicle approaches an incline, the locking ball 36 will roll on guide surface 56 toward the control cam shaft 34. With the clutch pedal depressed and the cam profile 60 rotated away from the locking ball 56, the locking ball will engage the guide surface 56 and the connecting member 28, as shown in FIG. 3. A brake application at this time moves the connecting member 28 to the left in FIG. 2. The locking ball will not resist movement of the connecting member during the brake application as no wedging occurs with movement of the connecting member toward the larger end of opening 32. Upon termination of braking, the connecting member 28 will move slightly to the right in FIG. 2. With the locking ball engaging the connecting member 28 and the guide surface 56, the locking ball will roll about guide surface 56 and push the connecting member into tight engagement with the locking ball 36 at clearance 76 and with the side surfaces 72 and 74. The wedging force fb of the ball is opposed by the reaction force fr of the side surfaces 72 and 74 so that the connecting member is deformed. The edges 78 and 80 approach the locking ball 36 to reduce or eliminate the spacing 82 and the connecting member 28 is moved upwardly into clearance 76, as shown in FIG. 4. Consequently, the connecting member 28 is wedged into the side surfaces 72 and 74 at the same time the locking ball is wedged into the connecting member 28 and the guide surface 56.

If the vehicle operator imparts a large input force to the brake pedal which is greater than necessary to hold the vehicle on the incline, the brake system will impart an equivalent reaction force, when the brake pedal is released, biasing the brake pedal to return to its released position. This larger than necessary reaction force acts on the connecting member 28 to move the connecting member 28 and locking ball 36 from the second position tightly engaging the connecting member and guide surface to the third position wherein the locking ball 36 abuts the cam profile 60 to prevent further wedging. Additional deformation of the connecting member occurs, however, the connecting member remains spaced from or lightly contacting the surface 70. Thereafter, the larger reaction force causes the connecting member to fritionally slide or slip relative to the locking ball until the friction force of the locking ball against the connecting member is adequate to retain the brake pedal in an applied position holding the vehicle on the incline. Thus, the flexibility of the connecting member provides a means for limiting the force applied to retain the brake pedal. The orientation of the cam profile 60, the locking ball 36, the guide surface 56 and the connecting member 28 is designed so that a predetermined friction force is imparted to the connecting member to transmit a predetermined locking force to the brake pedal when in an applied position with the vehicle on the incline. As a result, the vehicle operator is free to move his foot from the brake pedal to the accelerator with the vehicle remaining stationary on the incline. In addition, because the control device operates at a limited or maximum friction force for the connecting member, the various components of the control device and the bracket 16 can be made from lightweight materials.

In order to move the vehicle up the incline, the clutch pedal is released at the same time the accelerator is depressed. Releasing the clutch pedal rotates the cam profile to move the locking ball out of tight engagement with the connecting member and the guide surface. Movement of the locking ball permits the connecting member to deform to its original shape. The flexibility of the connecting member results in gradual separation between the locking ball and the connecting member, so that the locking ball does not "pop" out of engagement with the connecting member to generate irritating noises and impact against the plate 42. In addition, the flexibility of the connecting member permits a larger area of contact or interface between the connecting member and locking ball when the latter is in its third position retaining the brake pedal in the applied position.

I claim:

1. An improved mechanical brake control device for a vehicle including a brake pedal and a clutch pedal wherein the brake is movable to a brake applied position during braking and the clutch pedal is movable to an actuated position to control operation of a transmission or the like for the vehicle, the device comprising a housing associated with the vehicle, a connecting member coupled to the brake pedal and movable therewith relative to the housing, locking means carried by the housing and cooperating with the connecting member, control means coupled to the clutch pedal and cooperating with the locking means to alter the cooperation of the latter with the connecting member in response to the position of the clutch pedal, the locking means being engageable with the connecting member when the vehicle is on an incline and the clutch pedal is in its actuated position to resist movement of the connecting member and retain the brake pedal in the brake applied position whereby the vehicle is substantially prevented from rolling down the incline, characterized in that said connecting member is a resilient connecting member that deform slightly when said locking means is engaging said connecting member and the deformation of said resilient connecting member providing for gradual disengagement between said locking means and said resilient connecting member in response to operation of said control means.

2. The device of claim 1, in which said housing defines an opening therethrough and said resilient connecting member extends therethrough, said housing including a pair of plates, respectively disposed at opposite ends of said housing, and said pair of plates including resilient tabs supporting said resilient connecting member for movement in said opening.

3. The device of claim 1, in which said locking means cooperates with said resilient connecting member to define a first wedge-fit in response to said locking means tightly engaging said housing and said resilient connecting member, and said resilient connecting member cooperating with said housing to define a second wedge-fit in response to deformation of said resilient connecting member.

4. The device of claim 1, in which said resilient connecting member comprises a thin sheet of resilient material.

5. The device of claim 4, in which said sheet is formed with an arcuate portion extending through said housing 6. The device of claim 5, in which said housing is provided with an opening for receiving said resilient connecting member and a wall of said opening forms a clearance with said resilient connecting member to permit deformation of the latter.

7. The device of claim 6, in which surfaces of said opening are engageable with said arcuate portion at areas adjacent longitudinally-extending opposite edges of the arcuate portion.

8. The device of claim 7, in which said locking means is engageable with said arcuate portion between said longitudinally-extending opposite edges.

9. The device of claim 8, in which the locking means comprises a ball movable on a guide surface in said housing.

10. The device of claim 1, in which said control means is movable from a first position preventing engagement between said locking means and said connecting member to a second position permitting engagement between said locking means and said connecting member, and said locking means is engageable with said control means when the control means is in the second position in order to limit the engagement between said connecting member and said locking means to a fully engaged condition.

11. The device of claim 1, in which said connecting member is relatively flexible in a plane perpendicular to a direction of movement for said connecting member and relatively inflexible in a plane parallel to said direction.

12. The device of claim 1, in which the connecting member includes an aperture for receiving resiliently therein a bracket attached to the brake pedal.

13. The device of claim 12, in which the bracket includes a spring biased against said connecting member to prevent rattle and eliminate clearance therebetween.

14. The device of claim 1, in which the locking means comprises a ball disposed on a guide surface in said housing.

15. An improved mechanical control device operatively connected with a brake pedal and a clutch pedal and operable to retain the brake pedal in an applied position in response to operation of the clutch pedal, said device including means for limiting the force applied to retain said brake pedal in the applied position when the clutch pedal is operated, and a connecting member coupled to said brake pedal, the connecting member comprising a substantially flexible sheet of material which is deformable to define partially said force limiting means.

16. The device of claim 15, in which a control means is coupled to said clutch pedal, and locking means is capable of forming a connection with both said connecting member and control means to substantially define said limiting means.

17. The device of claim 15, in which said connecting member is a flexible connecting member and said control device includes a ball engagable with said flexible connecting member, said flexible connecting member increasing the area of contact with said ball in response to increasing forces imparted to said brake pedal to depress the latter.

18. An improved mechanical control device for a vehicle cooperating with a brake pedal and a clutch pedal, said device being responsive to operation of said brake pedal and said clutch pedal when said vehicle is on an incline to retain said brake pedal in a brake applied position so long as said clutch pedal is maintained in an applied position, characterized in that said device includes a flexible connecting member coupled to said brake pedal, said flexible connecting member being deformable to control the retention of said brake pedal in the applied position.

19. The device of claim 18, further comprising a housing which defines an opening therethrough and the flexible connecting member extending therethrough, said housing including a pair of plates, respectively disposed at opposite ends of said housing, and said pair of plates including resilient extensions supporting said flexible connecting member for movement in said opening.

20. The device of claim 19, wherein said flexible connecting member includes an arcuate portion extending through said housing, and surfaces of said opening are engagable with said arcuate portion at areas adjacent longitudinally-extending opposite edges of the arcuate portion.

21. The device of claim 18, in which the flexible connecting member includes an aperture for receiving resiliently therein a bracket attached to the brake pedal.

22. The device of claim 21, in which the bracket includes a spring biased against said connecting member to prevent rattle and eliminate clearance therebetween.

23. A mechanical brake control device wherein a brake pedal for a vehicle is retained in a brake-applied position when a clutch pedal for the vehicle is depressed and the vehicle is on an incline, the device including a connecting member coupled to the brake pedal and a control assembly forming an operative connection with the connecting member and the clutch pedal, the control assembly normally defining a free-fit with the connecting member to permit free movement of the latter when the vehicle is on a level surface and the control assembly defining a locking-fit with the connecting member when the vehicle is on an incline with the clutch pedal depressed to retard movement of said connecting member relative to said control assembly, characterized in that said locking fit forms a variable interface between said connecting member and said control assembly so that the force which opposes movement of said connecting member is variable in response to the force imparted to the brake pedal.

24. The device of claim 23, in which said connecting member is a flexible connecting member and said control assembly includes a ball engageable with said flexible connecting member to form said locking-fit, said flexible connecting member increasing the area of contact with said ball in response to increasing forces imparted to said brake pedal to depress the latter.

25. The device of claim 23, in which said control assembly includes means to limit the interface between said connecting member and said control assembly.

* * * * *